United States Patent Office  3,689,472
Patented Sept. 5, 1972

3,689,472
PROCESS FOR PREPARING TRIAZINES AND CROSSLINKED POLYMERS OR COPOLYMERS
William E. Emerson and Edwin Dorfman, Grand Island, N.Y., assignors to Hooker Chemical Corporation, Niagara Falls, N.Y.
No Drawing. Continuation of abandoned application Ser. No. 634,877, May 1, 1967. This application Aug. 24, 1971, Ser. No. 174,547
Int. Cl. C08f 3/74
U.S. Cl. 260—88.7 E                     12 Claims

ABSTRACT OF THE DISCLOSURE

This invention (A) relates to a process for producing at preferably low reaction temperatures, a triazine at high levels of conversion and yield from a haloalkanenitrille such as perfluoroalkane nitrile by the novel employment of a catalytic amount of a member selected from the group consisting of (1) an organic amine oxide, (2) an organic amine oxide hydrochloride of said organic amine oxide, and mixtures thereof, and (3) an organometallic catalyst selected from group consisting of (a) an organometallic compound containing at least one metal-to-carbon bond in which said metal is selected from the group consisting of metals of the Periodic Table Groups III–B, IV–B, V–B, VI–B, VII–B, VIII, I–B, II–B, a Group V–A metal having an atomic weight of at least about 30, and a Group IV–A metal, and (b) a metal or metalloxy beta-ketoenolate of the formula:

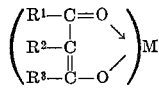

In which $n$ is an integer equal to the valence of the metal or metalloxy ion, and in which each of $R^1$, $R^2$, and $R^3$ is selected from the group consisting of hydrogen and an organic substituent, and in which $R^2$ additionally incudes halogen, nitro or sulfo, and also (B) relates to the novel employment of the above described catalyst in a catalytic amount employed with a polymer or copolymer containing at least greater than an average of one cyanohaloalkyl group per molecule of the polymer or copolymer, to form a cross-linked polymer or copolymer.

---

This invention is directed to a novel process for producing triazine compounds. More particularly, the invention relates to a process for producing triazines from an organic nitrile such as either an aromatic or an haloalkane nitrile in the presence of at least a catalytic amount of a critical catalyst. This application is a continuation of Ser. No. 634,877, now abandoned.

BACKGROUND OF THE INVENTION

Prior to this invention, triazines have been produced from nitriles by the employment of a catalytic amount of particular catalysts such as metal oxides or elemental metals, or various combinations of such materials. Although varying degrees of success have been obtained by the employment of such catalysts, because there remain certain problems which have not altogether been overcome, the search for new methods of producing triazines continues. A United States application directed to the condensation of nitriles employing metal oxide catalysts is a copending application Ser. No. 570,183, and a typical patent employing combinations of ingredients which jointly have a catalytic effect sufficiently to convert a nitrile into a triazine in U.S. Pat. No. 3,095,414. One of the components necessary as set forth in the above-referred-to patent is an organometallic compound of Group II–B or III–B of the Periodic Table.

Literature has been published which discloses that perfluoroalkylenetriazine polymers which do not contain nitrile groups may be cross-linked by reaction with tetraphenyltin. However, it has been discovered that the degree of cross-linking is merely a minor amount and is normally insufficient for practical use in utilities requiring a substantial degree of cross-linking.

One of the problems of typical processes for the conversion of a nitrile into a triazine is the conventional requirement of high temperatures. Another problem relates to the need to obtain both a high yield and a high conversion in the production of a triazine from a nitrile.

Accordingly, it is an object of this invention to obtain a novel process for the production of a triazine or mixtures of triazines from one or more nitriles.

Another object is a process of producing a triazine from a nitrile at a high degree of conversion and in a high degree of yield.

Another object is a process of producing a novel triazine composition.

Another object is a process which employs a critical catalyst whereby a nitrile is trimerized to form a triazine.

Another object is a process which employs a low reaction temperature in the production of a triazine from a nitrile.

Another object is a process for the production of triazines from haloalkanenitriles by the employment of a critical catalyst.

Another object is a process for cross-linking a polymer or copolymer to form a cross-linked polymer or copolymer.

Another object is a composition comprising novel cross-linked polymer or copolymer thereof, in combination with a catalyst of this invention.

Other objects become apparent from the above and following disclosure.

THE DESCRIPTION

The objects of this invention are obtained by a process comprising contacting (A) at least a catalytic amount of a first member selected from the group consisting of an organic amine oxide such as (1) a cyclic amine oxide, a heterocyclic amine oxide, and either a substituted or non-substituted alkylamine oxide, and mixtures thereof, (2) an organic amine oxide hydrochloride of said organic amine oxide and mixtures thereof, and (3) an organometallic catalyst selected from the group consisting of (a) an organometallic compound containing at least one metal-to-carbon bond in which said metal is selected from the group consisting of metals of the periodic Table Groups III–B, IV–B, V–B, VII–B, VIII, I–B, II–B, a Group V–A metal having an atomic weight of at least about 30, and a Group IV–A metal, and (b) a metal or metalloxy beta-ketoenolate of the formula:

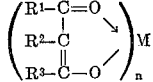

in which M is a metal ion or a metalloxy ion (such as vanadyl), in which $n$ is an integer equal to the valence of the metal or metalloxy ion, in which each of $R^1$ and $R^3$ is a substituent selected from the group consisting of hydrogen and an organic substituent such as alkyl, aryl, heterocyclyl, aralkyl, alkaryl, alkoxy, aryloxy, and substituted forms thereof wherein substituents of said substituted forms thereof include at least one substituent selected from the group consisting of halogen, alkoxy, aryloxy, and the like, provided the substitutent does not cause the beta-ketoenolate to become inoperative as a catalyst for purposes of this invention, and in which $R^2$ is selected from the group consisting of the substituents of $R^1$ and $R^3$, halogen, nitro, and sulfo, and the like, and mixtures of two or more of said first member with (B) a second member selected from the group consisting of (1) at least one organic nitrile and mixtures of two or more of said organic nitrile, and (2) at least one polymer or copolymer which contains an average of at least more than one nitrile group per molecule of said polymer or copolymer, and mixtures of two or more of said polymer or copolymer, said contacting being at a temperature and for a time-period sufficient to produce, respectively, a composition comprising (1) a triazine composition or (2) a cross-linked polymer or copolymer composition containing said first member, and said contacting being in the absence of a catalytic amount of a composition comprising (1) an inorganic salt or an alcoholate of a metal of the Periodic Table Groups I–V, V–A, VI–A, and VIII, and (2) an organometallic compound of a metal selected from the group consisting of Periodic Table Groups II–B and III–B.

The preceding paragraph refers to the necessity of an average of at least more than one nitrile group per molecule. Thereby, this invention requires (1) that at least one polymer or copolymer molecule contain two nitrile groups, and (2) that each molecule contain at least one nitrile group. Any polymer or copolymer molecule that does not contain at least one nitrile group is not a part of those molecules upon which the average of greater than one per molecule is based; a polymer or copolymer not containing a nitrile group would constitute merely a filler material. In a like manner, the language "at least greater than an average of one cyanofluoroalkyl group per molecule" has the same meaning. Also it should be noted that the degree of cross-linking increases with a corresponding increase in the number of nitrile groups per molceule. The optimum number of nitrile groups on the chain will therefore depend upon the properties desired for a particular use. Also, the optimum number of nitrile groups on the molecule depends upon the molecular weight of the polymer or copolymer employed. It should be noted that it is within the scope of this invention to employ polymers or copolymers such as triazine polymers which may be degraded by some means such as by milling, for example, to produce fragments, some of which contain the nitrile groups.

The preferred nitrile is a haloalkane nitrile. Within this group is the preferred perhaloalkane nitrile preferably selected from the group consisting of perfluorooctanonitrile, trichloroacetonitrile, 4-bromohexafluorobutyronitrile and mixtures thereof, in which said triazine composition comprises tris(perfluoroheptyl)triazine, tris(trichloromethyl)triazine, tris(3 - bromohexafluoropropyl)triazine, and mixtures thereof. The polymer or copolymer preferably is selected from the group consisting of perfluoroalkylenetriazine polymers and copolymers, perfluoroalkylene ether polymers, perfluoropropylene - vinylidene fluoride copolymers, fluoroalkyl silicone polymers, tetrafluoroethylenenitrosotrifluoromethane copolymers, each of which contains at least greater than an average of one cyanoperfluoroalkyl group per molecule, and mixtures thereof.

A novel aspect of this invention resides in the employment of a critical catalyst as defined above. It has unexpectedly been discovered that by the employment of the catalyst of this invention, one or more of the above objects are thereby obtained, depending upon the particular catalyst employed. Also, in view of particular prior art, such as U.S. Pat. 3,095,414 which required the presence of a particular salt with an organometallic compound, and moreover, which required the presence of a particular salt with an organometallic compound of metals selected from particular groups of the Periodic Table, it was unexpectedly discovered that the objects of this invention may be obtained by the employment of the catalyst of this invention in the absence either of the particular salt of U.S. Pat. No. 3,095,414 or of an inorganic oxide such as disclosed in the copending U.S. patent application Ser. No. 570,183, referred to above. Moreover, it has been discovered unexpectedly that by the employment of certain of the preferred catalysts of this invention, the reaction of our invention will take place at unexpectedly low temperatures.

The novel process of this invention includes the steps of curing a polymer or copolymer in which at least greater than an average of one nitrile group per molecule is a part of a cyanohaloalkyl group, in the presence of the above described catalyst, the curing being (1) at a sufficiently elevated temperature and for a period sufficiently long and (2) in the prence of a sufficient number of polymer cyanohaloalkyl groups, to cross-link (vulcanize) to form a cross-linked polymer or a cross-linked copolymer. The process may employ any polymeric composition having at least greater than an average of one cyanohaloalkyl group per molecule, in the novel presence of a catalytic amount of the catalyst of this invention to cross-link to form a cross-linked polymer or copolymer of this invention. The polymers and copolymers of the novel curing process exhibit novel properties different from what might appear to be corresponding cross-linked polymers and copolymers produced by other methods. The particular properties depend upon which catalyst of this invention is employed. For example, a novel use of the polymer composition of this invention is the employment as a sealant for high temperature use, and it may be cured in situ.

Although particular Periodic Table Groups of the metals of the metal-to-carbon bonded organometallic compounds are employed in the description of embodiments of this invention, and although Group I–B, and Group II–B are not conventionally included in the term "transition metals," it nevertheless should be noted that experimental evidence suggests that the transition metals and also metals of Group I–B, Group II–B, Group IV–A, and Group V–A may be satisfactorily employed as the metal for the metal-to-carbon bonded organometallic compounds of this invention.

A preferred organic amine oxide or hydrochloride thereof is a polyalkyl compound such as trialkylamine oxide or the hydrochloride thereof.

Typical alkylamine oxide and alkylamine oxide hydrochloride catalysts within the scope of this invention may include alkyl substituents such as methyl, butyl, propyl, ethyl, benzyl, phenethyl substituted forms thereof, hydrochlorides thereof, and the like, so long as the objects of this invention are obtained thereby. Aromatic amine oxides typically include N,N-dimethylphenylamine oxide. Typical preferred organic amine oxides include trimethylamine oxide, N-ethyl-N-methylbutylamine oxide, and N,N-diethylphenethylamine oxide. Typical preferred amine oxide hydrochlorides include trimethylamine oxide hydrochloride and pyridine-N-oxide hydrochloride. For example, the catalyst trimethylamine oxide hydrochloride employed with, for example, perfluorooctanonitrile, at normally a trimerization temperature of about 70 degrees centigrade for a period of about 19 hours produced a conversion of about 12 percent. The obtaining of this conversion at such a low temperature is highly unexpected.

Illustrative cyclic amine oxides and cyclic oxide hydrochlorides within the scope of this invention typically include N,N - dimethylcyclohexylamine oxide, N,N-dimethylphenylamine oxide, hydrochlorides thereof; and the like.

Illustrative heterocyclic amine oxides typically include: 1,4-dioxo-1, 4 - diaza[2,2,2]bicyclooctane; phenazine-N-oxide, pyridine - N-oxide; N-methylmorpholine-N-oxide; N-methylpiperidine-N-oxide; hydrochlorides thereof; and the like.

Illustrative metal-to-carbon bonded organometallic catalytic compounds typically include: (1) the preferred organotin catalysts such as preferably tetraphenyltin, dibutyltin sulfide, tributyltin acrylate, triphenyltin chloride, hexabutyltin, dibutyldivinyltin, triethyltin chloride, tetraethyltin, dibutyltin diacetate, dioctyltin maleate, triphenyltin hydroxide, tetravinyltin, and the like; (2) the preferred organoantimony catalysts such as preferably tributylantimony, tributylantimony oxide, triphenylantimony, triphenylantimony sulfide, and the like; (3) organolead catalysts such as preferably tetraphenyllead; (4) organomercury catalysts such as phenylmercuric acetate and diphenylmercury; (5) organoarsenic catalysts such as triphenylarsine and triphenylarsine oxide; (6) organoiron catalysts such as ferrocene (dicyclopentadienyl iron), chloromercuriferrocene, acetylferrocene, 1-1'-bis(chloromercuri)ferrocene, and bis(cyclopentadienyl)iron dicarbonyl dimer; (7) organotitanium catalysts such as bis-(cyclopentadienyl)titanium dichloride; (8) organozirconium catalysts such as preferably bis(cyclopentadienyl) zirconium dichloride; (9) organophosphorus catalysts such as triphenylphosphine sulfide, dihexylphosphine oxide, trioctylphosphine oxide, triphenylphosphine, and preferably triphenylphosphine sulfide; (10) an organosilicon catalyst such as hexamethyldisilazane, triphenylsilicon azide, and the like; (11) an organocobalt catalyst such as dicobalt octacarbonyl and the like; (12) an organochromium catalyst such as chromium hexacarbonyl, and toluene chromium tricarbonyl, and the like; (13) an organobismuth catalyst such as triphenylbismuthine; (14) an organovanadium catalyst such as vanadium carbonyl; (15) an organomanganese catalyst such as manganese pentacarbonyl; and (16) an organotungsten catalyst such as tungsten hexacarbonyl.

Another typical catalyst within the scope of this invention, tributylantimony, when employed with perfluorooctanonitrile, produces about a 12 percent conversion in about 42 hours at a temperature of about 32 degrees centigrade. Again, this conversion at this exceedingly low temperature was highly unexpected.

Another catalyst within the scope of this invention, tributylantimony oxide, employed with perfluorooctanonitrile, produces a conversion of about 15 percent both (1) within the unexpectedly short period of 1.5 hours, and (2) at an unexpectedly low temperature of about 30 degrees centigrade.

The catalysts tributylantimony, tributylantimony oxide and trialkylamine oxide hydrochlorides (such as trimethylamine oxide hydrochloride) are each highly preferred embodiments of this invention which when employed produce high yields and/or as well as high conversions, at the unexpectedly low trimerization temperatures.

Of the catalysts of this invention, preferred results were obtained by the employment of tetraphenyltin which, for example, at about 20 hours at about 160 degrees centigrade produced, 100 percent yield and 100 percent conversion, and by the employment of tetraphenyllead which, for example, at about 20 hours and at about 190 degrees centigrade produced about 100 percent yield and about 93 percent conversion.

Also, under similar conditions, preferred results are obtained from dibutyltin sulfide which gives about a 100 percent yield and about a 100 percent conversion, tributyltin acrylate which gives about a 100 percent yield and about a 90 percent conversion, hexabutyltin which gives about a 100 percent yield and about a 92 percent conversion, dibutyldivinyltin which gives about a 100 percent yield and about a 100 percent conversion, triethyltin chloride which gives about a 100 percent yield and about a 100 percent conversion, tetraethyltin which gives about a 100 percent yield and about a 95 percent conversion, barium acetylacetonate which gives about a 100 percent yield and about a 100 percent conversion, and diphenylmercury which gives about a 100 percent yield and about a 95 percent conversion, at about 190 degrees centigrade for about 20 hours.

As briefly discussed above, the particular trimerization temperature and also the length of the period of trimerization at a given temperature determine to a significant degree the extent to which trimerization is carried to completion if trimerization occurs at all at that particular temperature. Thus, the temperature and period of trimerization must be adjusted to the particular catalyst employed. There is a substantial amount of experimental evidence which substantiates that some catalysts of this invention which appear to be substantially ineffective as trimerization catalysts at lower temperatures produce good results at higher trimerization temperatures. For example, as stated above, the preferred tributylantimony, tributylantimony oxide, and trialkylamine oxide hydrochloride each produce good results at unexpectedly low trimerization temperature. In contrast, tetraphenyltin and dibutyltin sulfide each are significantly more effective at temperatures substantially above about 30 degrees centigrade (such as about 100 degrees centigrade) with perfluorooctanonitrile. Accordingly, the absence of good results at a given temperature for a particular catalyst of this invention is merely evidence that to obtain improved results for that particular catalyst, a higher temperature and/or a longer period must be employed for that particular nitrile.

The preferred metal-to-carbon bonded phosphorus compounds are the sulfides such as triphenylphosphine sulfide. Experimental evidence suggests that for non-sulfide phosphorus compounds such as triphenylphosphine, successful (satisfactory) trimerization conditions must include a temperature above about 190 degrees centigrade and/or a trimerization period greater than about twenty hours, when the particular nitrile is perfluorooctanonitrile. For example, at 190 degrees centigrade for 20 hours, trioctylphosphine oxide produces merely 1 percent conversion; see Example V, Experiment No. 6.

Similarly, whereas iron is the preferred metal of Group VIII metal-to-carbon bonded catalytic compounds, nickel is less desirable for perfluorooctanonitrile on the basis of analogous experimental evidence.

Based on additional analogous experimental evidence of the type discussed above for perfluorooctanonitrile, tin and lead are preferred metals, for metal-to-carbon bonded compounds, for Group IV–A as contrasted for example to silicon or germanium, for compounds such as tetraphenylsilane and tetraphenylgermanium; thus the preferred metals of Group IV–A have an atomic weight of at least 118.

Based on additional analogous experimental evidence employing acetylacetonates of aluminum, beryllium, and chromium to catalyze the trimerization of perfluorooctanonitrile, the acetylacetonates of these metals similarly require a trimerization temperature and/or period greater than about 190 degrees centigrade for about 20 hours.

Similarly, relative to the organic amine oxides and hydrochlorides thereof, experimental evidence suggests that the trimerization using particular specific hydrochlorides takes place at lower temperatures and at shorter periods than the corresponding organic amine oxides, and that trimethylamine oxide is substantially inactive at temperatures of about 70 degrees centigrade or less, as compared to the hydrochloride thereof.

Other typical catalysts illustrative of compounds within the scope of this invention include tributylamine oxide, organometallic compounds of metals such as molybdenum, manganese, silver and the like, and metal or metalloxy beta-ketoenolates in which the $R^1$, and/or $R^2$, and $R^3$ are substituents such as methyl, phenyl, cyclohexyl, phenethyl, methylphenyl, ethoxy, phenoxy, and the like.

In the preceding disclosure, the term "percent conversion" refers to the degree to which a nitrile is converted during the trimerization reaction, whereas the term "percentage yield" refers to the percentage of converted nitrile which is triazine. Additionally it should be noted, however, that the percentage yield and the percentage conversion for each of the catalysts as given above is not intended as a limitation restricting the scope of any one or more of the above catalysts, the conversion and yield data given for each catalyst being only illustrative of the relative value of the various catalysts of this invention in comparison to each other. Also, the considerations of conversion and yield for a particular catalyst are not considered solely in abstraction, but must be considered with other advantages or disadvantages, such as the required reaction time and/or temperature to obtain the particular conversion and/or yield. Also, for example, the ready, commercial availability of a particular catalyst or the components from which they are produced, is also a factor of major importance.

The embodiment of this invention employing organometallic catalysts, based upon current terminology, requires that organometallic catalysts be divided into two separate and distinct groups. One group of compounds which constitute typical catalysts within the scope of this invention is defined as above-identified metal-carbon bonded organometallic compounds in which the metal typically is tin, lead, arsenic, antimony, phosphorus, bismuth, mercury, iron, titanium, zirconium, and the like. The second group of catalysts is defined as the above-identified metal or metalloxy beta-ketoenolates in which the metal is preferably calcium, barium, copper, cobalt, iron, zinc, manganese, molybdenum, nickel, lead, titanium, vanadium, zirconium, magnesium, sodium, thorium, and the like.

The organic nitrile which may be employed as the beginning reactant in this invention generally includes any conventional organic nitrile such as those disclosed in U.S. Pat. No. 3,095,414 and copending application U.S. Ser. No. 570,183. Accordingly, organic nitriles listed in the above patent such as:

2-methylbenzonitrile;
3-ethylbenzonitrile;
4-butylbenzonitrile;
3-nitrobenzonitrile;
2-ethyl-4-nitrobenzonitrile;
2,4-dimethylbenzonitrile;
2,6-dimethylbenzonitrile;
2-ethyl-3,4,5-trimethylbenzonitrile;
1-naphthonitrile;
2-naphthonitrile;
3-methyl-1-napthonitrile;
1-cyanoanthracene;
2-cyanoanthracene;
trichloroacetonitrile;
trimethylacetonitrile;
tribromoacetonitrile;
2,2-dichloropropionitrile;
2,2-diodopropionitrile;
2-iodo-2-methylvaleronitrile;
2,2-difluoro-1-decyl cyanide, and the like, may be employed. Similarly, organic nitriles of the above-cited copending application which are typical beginning reactants for this invention include:
perfluorobutyronitrile;
difluoroacetonitrile;
difluorochloroacetonitrile;
perfluoroglutaronitrile;
perfluorosuccinonitrile; trifluoroacetonitrile;
pentafluoropropionitrile;
perfluoromalononitrile,
bromotetrafluoropropionitrile;
bromooctafluorovaleronitrile;
nonafluoro-3-thiabutyronitrile;
perfluoroethyladiponitrile;
perfluorosuberonitrile;
perfluorosebaconitrile;
perfluorovaleronitrile;
bromodifluoroacetonitrile;
perfluoroadiponitrile;
perfluorotetradecane dinitrile;
perfluoromethoxypropionitrile;
perfluoroethoxypropionitrile;
perfluorocapronitrile;
3,4-dibromopentafluorobutyronitrile;
trifluoromethylbenzonitrile;
chlorobenzonitrile;
dichlorobenzonitrile; polychlorobenzonitriles;
perfluorododecanenitrile;
perfluorotetradecane nitrile;
perfluorostearonitrile;
benzonitrile;
2-nitro-4-trifluoromethylbenzonitrile;
perfluorooleonitrile;
m-(trifluoromethylbenzoyl)benzonitrile;
2-phenyl-2,4,4,4-tetrafluoroacetonitrile;
perfluorobenzonitrile,
nitriles of the formula:

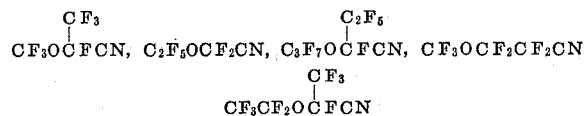

wherein $m$ is one or more,
wherein $R^1_f$ is lower perfluoroalkyl and $R_f$ is selected from the group consisting of fluorine and perfluoroalkyl of from 1 to 12 carbon atoms, such as:

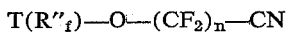

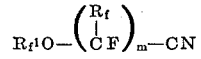

and the like; nitriles of the formula:

$$T(R''_f)-O-(CF_2)_n-CN$$

wherein T is selected from the group consisting of hydrogen and halogen, $R''_f$ is perfluoroalkylene of 1 to 12 carbon atoms, and $n$ is from 1 to 10, such as:

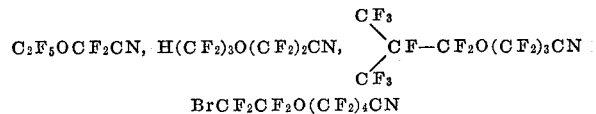

$BrCF_2CF_2O(CF_2)_4CN$ perfluoroisobutyloxypropionitrile, perfluorohexyloxypropionitrile, perfluorooctyloxypropionitrile, and the like; and mixtures of the aforementioned nitriles. It is to be understood that the above-listed organic nitriles are not all inclusive, but are merely intended to illustrate some of the compounds which are contemplated for purposes of this invention.

As noted above, it is within the scope of this invention to employ nitriles such as benzonitrile or acetonitrile, for example. However, for nitriles of this general type, experimental evidence suggests that a trimerization temperature and trimerization period must exceed about 190 degrees centigrade and/or about 20 hours to produce a triazine, when employing random catalysts of this invention. For example, at about 190 degrees centigrade for 20 hours, there appeared to be no significant trimerization reaction for each of the following aromatic nitriles with any one of the following respective catalysts: (1) p-nitrobenzonitrile with any one of tributylantimony, or tetraphenyllead, or tributyltin chloride; (2) 1-naphthonitrile with any one of tetraphenyltin, or triphenylbismuth, or copper acetylacetonate; (3) p-fluorobenzonitrile with any one of N-methylmorpholine oxide, or dibutyltin sulfide, or bis(cyclopentadienyl)titanium dichloride; (4) anisonitrile with any one of barium acetylacetonate, or ferrocene, or lead acetylacetonate; and (5) p-chlorobenzonitrile with any one of diphenylmercury or tetraphenyltin, or triphenylphosphine sulfide.

Therefore, as noted above, the haloalkanenitriles are the preferred reactants for this invention. These nitriles are characteristically trimerized at 190 degrees centigrade or less, in twenty or less hours. For example, at 190 degrees centigrade for 20 hours, for each of tetraphenyltin and tributylantimony oxide, 100 percent yields and conversions are obtained, and lead acetylacetonate gives a moderate yield and 100 percent conversion, when each respectively is employed with trichloroacetonitrile. Analogous results are also obtained, for example, employing ω-bromohexafluorobutyronitrile. Within this group, separate but not necessarily exclusive preferred embodiments are those haloalkanenitriles having at least one fluoro substituent, and secondly, those haloalkylnitriles having at least two halo substituents. A third embodiment which obtains the better results is a haloalkanenitrile which contains at least two fluoro substituents. Typical examples of these various preferred embodiments include perfluorobutyronitrile,
perfluorosuberonitrile,
perfluorosebaconitrile,
perfluorovaleronitrile,
perfluorotetradecanedinitrile,
perfluoroethoxypropionitrile,
difluoroacetonitrile,
trifluoroacetonitrile,
pentafluoropropionitrile,
bromotetrafluoropropionitrile,
bromooctafluorovaleronitrile,
nonofluoro-3-thiabutyronitrile,
monofluoroacetonitrile,
trichloroacetonitrile, and the like.

In order to bring about the trimerization reaction, it is merely necessary that the amount of catalyst be sufficient, based on percentage by weight of the nitrile employed to initiate and maintain a trimerization reaction. Except for practical purposes, there is no known maximum amount. However, because the catalyst normally would have to be removed from the reaction product, i.e., separated therefrom, it normally would be desirable to employ as little catalyst as necessary to accomplish the desired result. There would rarely be any need to employ higher than 10 percent of catalyst, based on the weight of the nitrile employed. The minimum amount of catalyst found to be normally necessary is at least about 0.01 percent by weight. The preferred percentage range is from about 0.05 percent to about 10 percent by weight.

The nitrile trimerization reaction may be run in any solvent which does not adversely react with the nitrile, the catalyst, or the reaction products of the nitrile and catalyst. Suitable solvents include, e.g., n-butyl acetate, carbon tetrachloride, ortho-chlorotoluene, chlorobenzene, nitrobenzene, cyclohexanone, ortho-dichlorobenzene, diethylcarbitol, dimethylsulfoxide, dioxane, ethyl acetate, and the like. This list is merely illustrative, and does not support to describe the vast number of solvents which can be used in the process of this invention. Similarly, such solvents may be employed with the polymer or copolymer composition (mixture) of this invention, for uses such as paints, sealants, and coatings.

The process of this invention is normally operable at a temperature of from zero to about 400 degrees centigrade, though it is preferably practiced in the zero degree centigrade to about 250 degree centigrade range depending upon the particular catalyst employed, more preferably above about 15 degrees centigrade, and including a curing temperature up to preferably about 190 degrees centigrade for the polymer or copolymer. Although it is normally desirable that the temperature employed be near room temperature if a good yield and conversion can be obtained, it is solely by the employment of particular preferred embodiments of this invention that it is possible to produce satisfactory yields at this low temperature, for example.

The reaction time is typically dependent on several factors such as the particular catalyst employed, the amount of catalyst employed, the temperature at which the reaction is carried out, and the degree of conversion desired, for example. A reaction time of from about two hours up to about seven days is normally satisfactory.

The degree of cross-linking for polymers and copolymers of this invention has been found to depend on the number of cyanohaloalkyl groups along the polymer chain, the amount of catalyst used, and on the time and the temperature range which is used in the curing process of the polymer. The polymers which have been cross-linked by this method have been perfluoroalkylenetriazine polymers of a wide range of molecular weight.

Lower molecular weight perfluoroalkylenetriazine polymers which have nitrile groups only at the polymer chain ends have been cured catalytically. Perfluoroalkylenetriazine polymers which have cyanoperfluoroalkyl groups at the 6 position of the triazine ring have also been successfully cured. The percentage of cyanoperfluoroalkyl groups at the 6 position of the triazine ring on these polymer molecules may vary from less than 1 percent up to 100 percent. A preferred percentage is from about 3 percent to 20 percent of nitrile-containing groups in the 6 position of the triazine ring. Perfluoroalkanenetriazine polymers have been described in our copending application U.S. Ser. No. 533,430, which disclosure is hereby incorporated by reference.

Other fluorine-containing polymers such as the tetrafluoroethylene - trifluoronitrosomethane copolymers might also be cured by these catalytic curing processes. Perfluoroalkylene ether polymers, perfluoropropylene-vinylidene fluoride copolymers, and fluoroalkyl silicone polymers and the like, also, typically may be cured by this catalyst.

The triazine and cross-linked polymer or copolymer products produced by this invention are typically useful in applications requiring high-temperature stability and chemically stability. The specific triazines produced by this invention are useful both as high temperature lubricants and solvents, whereas the polymer or copolymer produced when a dinitrile is condensed is useful in preparing highly heat-resistant molded articles.

The following examples are not intended to limit the invention disclosed herein except to the extent that limitations are specifically stated or to the extent to which limitations appear in the appended claims. All percentages are based on percent of theory unless otherwise stated.

EXAMPLE I

In this example, 3.56 parts of perfluorooctanonitrile was mixed with 0.384 part of tetraphenyltin and was heated to about 160 degrees centigrade for about 20 hours. The product obtained thereby was analyzed by infrared, and found to be tris(perfluoroheptyl)triazine. The yield and the conversion were both about 100 percent.

EXAMPLE II

In this experiment, 3.56 parts of perfluorooctanonitrile was admixed with 0.232 part of tetraphenyllead, and was heated at about 190 degrees centigrade for about 20 hours. The product thereof was analyzed by infrared and was found to be tris(perfluoroheptyl)triazine. The conversion was 93 percent and the yield was 100 percent.

EXAMPLE III

About 3.56 parts of perfluorooctanonitrile was admixed with about 0.118 part of cupric acetylacetonate, and heated at about 190 degrees centigrade for about 20 hours in a sealed tube. The product formed thereby was analyzed by infrared and found to be tris-(perfluoroheptyl)-triazine. The conversion was about 84 percent, and the yield was 100 percent.

In other experiments, the approximate procedures of Examples I, II, and III were repeated typically employing triphenylantimony, triphenylbismuth, dibutyltin diacetate, diphenyltin dichloride and tetramethyltin, respectively which gave conversions of 18 percent, 12 percent, 50 percent, 39 percent, and 1 percent respectively. In other experiments, perfluorooctanonitrile was admixed in separate consecutive experiments with acetylacetonates of metals such as cobalt, iron, manganese, molybdenum, nickel, lead, titanium, vanadium, zinc, zirconium, and magnesium and conversions ranging from about 1 mole percent to about 54 mole percent were obtained.

EXAMPLE IV (EXPERIMENTS 1-11)

In the following experiments as set forth in Table I below, a perfluoroalkylenetriazine polymer containing from one to twenty cyanoperfluoropropyl groups for every ninety-nine to eighty perfluoropropyl groups respectively in the polymer molecule was mixed with about 5 percent by weight of catalyst (1 g. polymer per 0.05 g. catalyst). The mixtures were then heated for the periods of time indicated, then tested for solubility in hexafluoroxylene which dissolves uncross-linked perfluoroalkylenetriazine polymers but not the cross-linked polymers.

As can be seen, vulcanization (i.e., curing or cross-linking) occurs at temperatures which range from 25 degrees centigrade to 150 degrees centigrade. Curing with tetraphenyltin is generally done at 150 degrees centigrade for 19 hours. Postcuring often increases the tensile strength of the vulcanized polymer.

TABLE I

| Experiment No. | Catalyst | Temp. (° C.) | Hrs. | Solubility |
|---|---|---|---|---|
| 1 | Copper acetylacetonate | 150 | 97 | Insoluble. |
| 2 | Barium acetylacetonate | 150 | 97 | Do. |
| 3 | N-methylmorpholine-N-oxide.[1] | 25 / 60 | 97 / 97 | Partly soluble. / Insoluble. |
| 4 | Dibutyltin sulfide | 150 | 97 | Insoluble. |
| 5 | Tributylantimony | 25 / 60 | 263 / 97 | Insoluble. / Do. |
| 6 | Tributylantimony oxide | 25 / 60 | 263 / 97 | Insoluble. / Do. |
| 7 | Trimethylamine oxide hydrochloride. | 100 | 263 | Insoluble. |
| 8 | Diphenylmercury | 150 | 97 | Do. |
| 9 | Ferrocene | 60 / 100 | 263 / 97 | Insoluble. / Do. |
| 10 | Tetraphenyllead | 150 | 97 | Insoluble. |
| 11 | Dibutyldivinyltin | 60 | 97 | Do. |

[1] The identity of this compound is not definetely confirmed at present; in any event, it is the product of the process of treating N-methylmorpholine with hydrogen peroxide.

EXAMPLE V (EXPERIMENTS 1-21)

In each of the Experiments 1-21, about 3.56 parts of perfluorooctanonitrile was subjected to the trimerization conditions and catalyst amounts as set forth in Table II below, in which the amount of catalyst employed is about 5 mole percent based on the number of moles of perfluorooctanonitrile.

TABLE II

| Experiment No. | Catalyst | Temp. degrees | Hrs. | Conversion, percent | Yield, percent |
|---|---|---|---|---|---|
| 1 | Dioctyltin maleate | 190 | 20 | 100 | 100 |
| 2 | Triphenyltin hydroxide | 190 | 20 | 100 | 100 |
| 3 | Tetravinyltin | 190 | 20 | 100 | 100 |
| 4 | do | 25 | 20 | [1] N.R. | |
| 5 | Hexamethyldisilazane [2] | 190 | 20 | 6 | 100 |
| 6 | Trioctylphosphine oxide.[3] | 190 | 20 | 1 | 100 |
| 7 | Triphenylantimony sulfide. | 190 | 20 | 13 | 100 |
| 8 | do | 25 | 20 | [1] N.R. | |
| 9 | Phenazine-N-oxide [4] | 190 | 20 | 3 | 100 |
| 10 | do.[4] | 25 | 20 | [1] N.R. | |
| 11 | Sodium acetylacetonate | 190 | 20 | 47 | 100 |
| 12 | Thorium acetylacetonace. | 190 | 20 | 69 | 100 |
| 13 | Chromium hexacarbonyl.[5] | 190 | 20 | 1 | 100 |
| 14 | do | 25 | 20 | [1] N.R. | |
| 15 | Dicobalt octacarbonyl [5] | 190 | 20 | 73 | 100 |
| 16 | do | 25 | 20 | [1] N.R. | |
| 17 | Dicyclopentadienyliron dicarbonyl dimer.[5] | 190 | 20 | 22 | 100 |
| 18 | do.[5] | 25 | 20 | [1] N.R. | |
| 19 | Chloromercuriferrocene. | 190 | 20 | 3 | 100 |
| 20 | Acetylferrocene | 190 | 20 | 5 | 100 |
| 21 | 1,1'-bis(chloromercuric ferrocene. | 190 | 20 | 3 | 100 |

[1] "N.R."=No reaction.
[2] An active organosilicon compound, i.e., hexamethyldisilazane: [(CH₃)₃SiNHSi(CH₃)₃].
[3] A non-sulfur containing phosphorus compound, i.e., trioctylphosphine oxide.
[4] 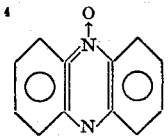 i.e., phenazine-N-oxide (in the class of heterocyclic compounds).
[5] A metal-carbonyl compound.

EXAMPLE VI

In additional series of experiments, following a procedure identical to Example V, 100% yields and 13%, 40%, 63%, 40%, 13%, 67%, and 1% conversions, respectively, were obtained from the catalysts vanadium, carbonyl, tungsten hexacarbonyl[W(CO)₆], manganese pentacarbonyl [Mn(CO)₅], molybdenum hexacarbonyl

[Mo(CO)₆]

bis(cyclopentadienyl)titanium dichloride, ferrocene, and bis(cyclopentadienyl)zirconium dichloride

[(C₅H₅)₂ZrCl₂]

respectively, at 190° C. for each experiment.

It is to be understood that the specification, including the Examples, are only illustrative of the invention claimed herein, and that it is within the scope of this invention to employ equivalents obvious to one skilled in the art. Any limitations appearing in the preceding disclosure are not intended to limit this invention except insofar as the limitations are stated to be important or otherwise appear in the appended claims.

We claim:

1. A process for preparing a cross-linked polymer or copolymer composition which comprises reacting at least one perfluoroalkylene triazine polymer or copolymer which contains at least one polymer or copolymer molecule containing two nitrile groups and wherein each molecule contains at least one nitrile group, at a temperature of about 0 to about 400 degrees centigrade, in the presence of a catalytic amount of a catalyst selected from the group consisting of (1) an organic amine oxide selected from the group consisting of (a) a cyclic amine oxide, (b) a heterocyclic amine oxide, (c) a substituted alkylamine oxide, and (d) an alkylamine oxide; (2) an organic amine oxide hydrochloride of said organic amine oxide; and (3) an organometallic catalyst selected from the group consisting of (a) an organometallic compound containing at least one metal-to-carbon bond in which said metal is selected from the group consisting of metals of the Periodic Table Groups I–B, II–B, III–B, I–V, V–B, VI–B, VII–B, VIII and a Group V–A metal having an atomic weight of at least about 30, and (b) a metal or metalloxy beta-ketoenolate of the formula:

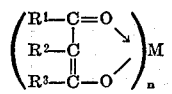

in which M is a metal ion or a metalloxy ion, in which $n$ is an integer equal to the valence of the metal or metalloxy ion, in which each of $R^1$ and $R^3$ is a substitutent selected from the group consisting of hydrogen and an organic substituent and substituted forms thereof wherein said substituted forms thereof each include at least one substituent selected from the group consisting of halogen, alkoxy, and aryloxy, and in which $R^2$ is selected from the group consisting of the $R^1$, $R^3$, halogen, nitro, and sulfo; and mixtures of two or more of said catalysts.

2. A process according to claim 1 in which said nitrile groups are part of a cyanohaloalkyl group, and in which said catalyst is present in an amount of at least about 0.01 percent by weight.

3. A process according to claim 2 in which each of said cyanohaloalkyl groups is a cyanoperhaloalkyl group, in which said temperature is in the range from about 0 to about 190 degrees centigrade, and in which said catalyst is in the range of about 0.05 to about 10 percent by weight.

4. A process according to claim 3 in which said temperature is above about 15 degrees centigrade and in which said metal or metalloxy beta-ketoenolate is a metal or metalloxy acetylacetonate.

5. A process according to claim 3, in which said metal-to-carbon bonded organometallic catalyst is an organotin compound.

6. A process according to claim 3, in which said metal-to-carbon bonded organometallic catalyst is an organoantimony compound.

7. A process according to claim 3, in which said metal-to-carbon bonded organometallic catalyst is selected from the group consisting of organolead, organosilicon, organoarsenic, organobismuth, organomercury, organotitanium, organoiron, organozirconium, organochromium, organocobalt, organovanadium, organotungsten, organomanganese, organomolybdenum, organophosphorus compounds and mixtures thereof.

8. A process according to claim 5, in which said organometallic catalyst is selected from the group consisting of dibutyltin diacetate, tetraphenyltin, dibutyltin distearate, dibutyltin sulfide, tributyltin acrylate, hexabutyltin, dibutyldivinyltin, tributyltin chloride, triethyltin chloride, tetraethyltin, dioctyltin maleate, triphenyltin hydroxide, tetravinyltin, bis(tributyltin)oxide, and mixtures thereof.

9. A process according to claim 6, in which said organometallic catalyst is selected from the group consisting of tributylantimony, tributylantimony oxide, triphenylantimony, triphenylantimony dichloride, triphenylantimony sulfide, and mixtures thereof.

10. A process according to claim 7 in which said organometallic catalyst is selected from the group consisting of tetraphenyllead, tetraethyllead, hexamethyldisilazane, triphenylsilicon azide, triphenylarsine, triphenylarsine oxide, triphenylbismuthine, diphenylmercury, phenylmercuric acetate, bis(cyclopentadienyl)titanium dichloride, ferrocene, chloromercuriferrocene, 1,1'-bis(chloromercuri) ferrocene, acetylferrocene, bis(cyclopentadienyl) iron dicarbonyl dimer, bis(cyclopentadienyl) zirconium dichloride, chromium hexacarbonyl, toluene chromium tricarbonyl, dicobalt octacarbonyl, vanadium carbonyl, tungsten hexacarbonyl, manganese pentacarbonyl, molybdenum hexacarbonyl, triphenylphosphine sulfide, trioctylphosphine oxide, dihexylphosphine oxide and mixtures of said catalysts.

11. A process acording to claim 4, in which the metal of the metal or metalloxy acetylacetonate is selected from the group consisting of calcium, barium, cobalt, copper, iron, manganese, molybdenum, nickel, lead, titanium, vanadium, zinc, zirconium, magnesium, sodium, and thorium; and mixtures of two or more of said acetylacetonates.

12. A process according to claim 3, in which said heterocyclic amine oxide is selected from the group consisting of 1,4-dioxo-1,4-diaza(2,2,2)bicyclooctane, phenazine-N-oxide, pyridine-N-oxide, N-methylmorpholine-N-oxide, and N-methylpiperidine-N-oxide; in which said substituted alkylamine oxide is selected from the group consisting of N-methyldibenzylamine oxide and N,N-diethylphenethylamine oxide; in which said alkylamine oxide is selected from the group consisting of trimethylamine oxide, triethylamine oxide, tripropylamine oxide, and N-ethyl-N-methylbutylamine oxide; in which said cyclic amine oxide is selected from the group consisting of N,N-dimethylcyclohexylamine oxide and N,N-dimethylphenylamine oxide; and in which said organic amine oxide hydrochloride of said organic amine oxide is selected from the group consisting of trimethylamine oxide hydrochloride and pyridine-N-oxide hydrochloride; and mixtures thereof.

References Cited

UNITED STATES PATENTS

| | | | |
|---|---|---|---|
| 3,470,176 | 4/1969 | Zollenger | 260—248 |
| 3,453,275 | 7/1969 | Grindahl | 260—248 |
| 3,542,660 | 11/1970 | Grindahl | 264—159.11 |
| 3,095,414 | 6/1963 | Spainhour | 260—248 |
| 3,308,101 | 3/1967 | Ikeda | 260—78.4 |
| 3,231,523 | 1/1966 | Wineman et al. | 260—2 |
| 3,410,809 | 11/1968 | Johns | 260—2 |

MORRIS LIEBMAN, Primary Examiner

R. ZAITLEN, Assistant Examiner

U.S. Cl. X.R.

260—2 M, 37 N, 248